United States Patent
Park et al.

(10) Patent No.: US 12,183,918 B2
(45) Date of Patent: Dec. 31, 2024

(54) METHOD AND SYSTEM FOR SILICON DOMINANT LITHIUM-ION CELLS WITH CONTROLLED LITHIATION OF SILICON

(71) Applicant: Enevate Corporation, Irvine, CA (US)

(72) Inventors: Benjamin Park, Mission Viejo, CA (US); Ian Browne, Orange, CA (US); Sung Won Choi, San Diego, CA (US); Fred Bonhomme, Lake Forest, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 16/584,574

(22) Filed: Sep. 26, 2019

(65) Prior Publication Data

US 2021/0098784 A1 Apr. 1, 2021

Related U.S. Application Data

(63) Continuation-in-part of application No. 16/213,826, filed on Dec. 7, 2018, now Pat. No. 10,847,792.
(Continued)

(51) Int. Cl.
*H01M 4/38* (2006.01)
*H01M 4/02* (2006.01)
(Continued)

(52) U.S. Cl.
CPC .......... *H01M 4/386* (2013.01); *H01M 4/134* (2013.01); *H01M 10/0525* (2013.01); *H01M 2004/027* (2013.01)

(58) Field of Classification Search
CPC .. H01M 4/386; H01M 4/134; H01M 10/0525; H01M 2004/027; H01M 4/0445; H01M 10/44; Y02E 60/10
See application file for complete search history.

(56) References Cited

U.S. PATENT DOCUMENTS

2015/0263379 A1* 9/2015 Xiao .................. H01M 4/0447
205/59
2016/0093884 A1 3/2016 Cui et al.
(Continued)

OTHER PUBLICATIONS

Li, X et al. "Degradation Mechanisms of High Capacity 18650 Cells Containing Si-Graphite Anode and Nickel-Rich NMC Cathode "Electrochim, Acta; Publication (online). Feb. 20, 2019 (Feb. 20, 2019) [retrieved Oct. 19, 2020 (Oct. 19, 2020]. Retrieved from the Internet: <URL:https://www.sciencedirect.com/science/article/pli/S0013468618326781>;DOI: 10.1016/j.electacta.2018.11.194;see entire document.
(Continued)

*Primary Examiner* — Lisa S Park
(74) *Attorney, Agent, or Firm* — McAndrews, Held & Malloy, Ltd.

(57) ABSTRACT

Systems and methods for silicon dominant lithium-ion cells with controlled lithiation of silicon may include a cathode, an electrolyte, and an anode. The anode may include silicon lithiated at a level after discharge that is configured to be above a minimum threshold level, where the minimum threshold lithiation is 3% silicon lithiation. The lithiation level of the silicon after charging the battery may range between 30% and 95% silicon lithiation, between 30% and 75% silicon lithiation, between 30% and 65% silicon lithiation, or between 30% and 50% silicon lithiation. The lithiation level of the silicon after discharging the battery may range between 3% and 50% silicon lithiation, between 3% and 30% silicon lithiation, or between 3% and 10% silicon lithiation. The minimum threshold level may be a lithiation level below which a cycle life of the battery degrades. The electrolyte may include a liquid, solid, or gel.

12 Claims, 8 Drawing Sheets

Related U.S. Application Data

(60) Provisional application No. 62/596,053, filed on Dec. 7, 2017.

(51) Int. Cl.
  *H01M 4/04* (2006.01)
  *H01M 4/134* (2010.01)
  *H01M 10/0525* (2010.01)
  *H01M 10/44* (2006.01)

(56) References Cited

U.S. PATENT DOCUMENTS

| | | | |
|---|---|---|---|
| 2018/0331356 A1* | 11/2018 | Feaver | H01M 4/587 |
| 2019/0181427 A1 | 6/2019 | Yang et al. | |
| 2019/0181440 A1 | 6/2019 | Park et al. | |

OTHER PUBLICATIONS

Int'l Search Report and Written Opinion Appln No. PCT/US2020/047785 mailed Apr. 7, 2022.

* cited by examiner

METHOD AND SYSTEM FOR SILICON DOMINANT LITHIUM-ION CELLS WITH CONTROLLED LITHIATION OF SILICON

CROSS-REFERENCE TO RELATED APPLICATIONS/INCORPORATION BY REFERENCE

N/A

FIELD

Aspects of the present disclosure relate to energy generation and storage. More specifically, certain embodiments of the disclosure relate to a method and system for silicon dominant lithium-ion cells with controlled lithiation of silicon.

BACKGROUND

Conventional approaches for battery anodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for silicon dominant lithium-ion cells with controlled lithiation of silicon, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
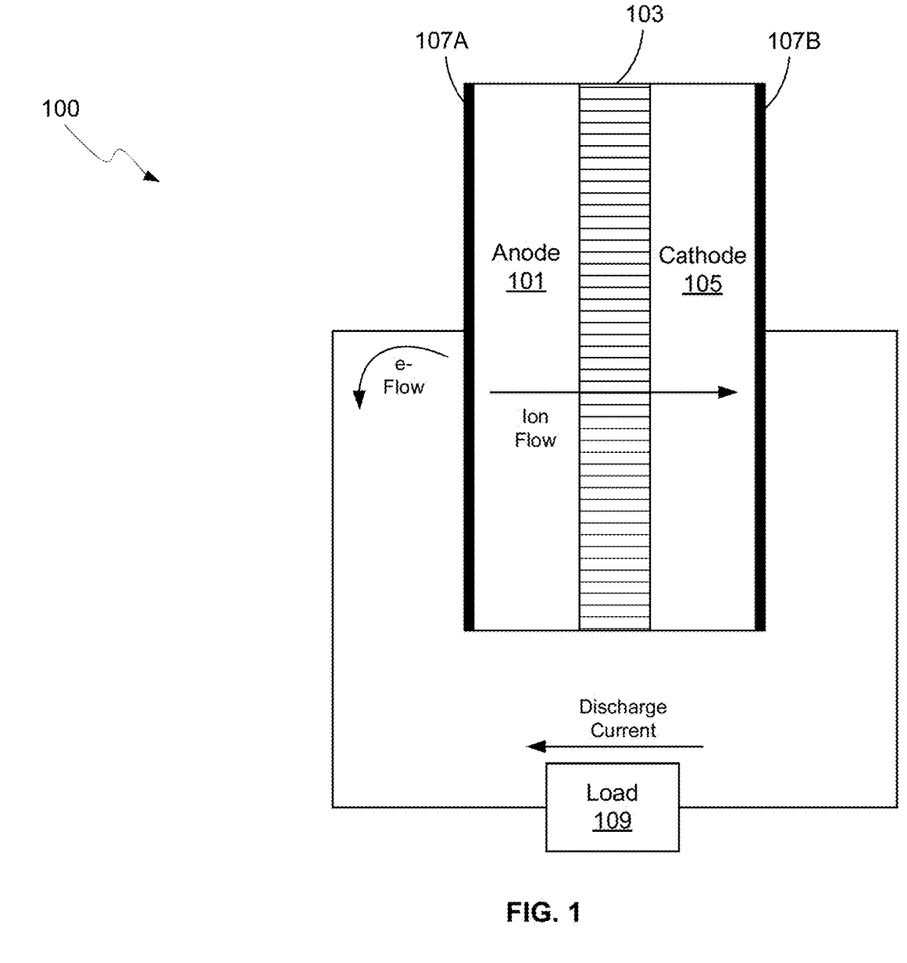
FIG. 1 is a diagram of a battery with a silicon-dominant anode, in accordance with an example embodiment of the disclosure.

FIG. 1 is a diagram of a battery with a silicon-dominant anode, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that include a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a low lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

Because of its high specific capacity, abundance and low cost, silicon is a promising active material for Li-ion anode. However its large volume change during lithiation and delithiation (>300% volume change) creates mechanical degradation of the electrode and an unstable SEI which leads to electrode swelling and poor cell cycle life. A silicon-dominant anode achieves best performance when the lithiation of the silicon anode is kept in a specific range. In order to achieve such performance, one can design a cell following the criteria described in FIG. 2, for example. Silicon material has an upper and a lower limit for lithiation for desired cell operation. The upper limit $x_H$ corresponds to the maximum lithium content silicon can accept without significantly impacting cycle life. The lower limit $x_L$ corresponds to a minimum threshold level, the minimum residual lithium content that needs to be left in the silicon structure in order to maximize cycle life. If the lithiation level falls below this level, cycle life reduces with each cycle. The fully lithiated phase of silicon at room temperature is $Li_{3.75}Si$, which translates to a maximum theoretical capacity of 3579 mAh/g for silicon, much higher than that of graphite (372 mAh/g).

The cell may be designed in a way that the maximum amount of lithium $x_C$ coming from the cathode does not exceed $x_H$. Similarly, the minimum amount of lithium left in the anode after discharge ($x_D$) needs to be higher than $x_L$. In this disclosure, a cell design is described where the silicon is partially pre-lithiated and then litheated/delithiated during operation to achieve the targeted cell capacity and energy. Pre-lithiation indicates that lithium is incorporated into the silicon upon manufacture of the anode, as opposed to the lithiation/delithiation that occurs during charging and discharging of the battery, and does not delithiate this pre-lithiation when discharged.

Figure 2:
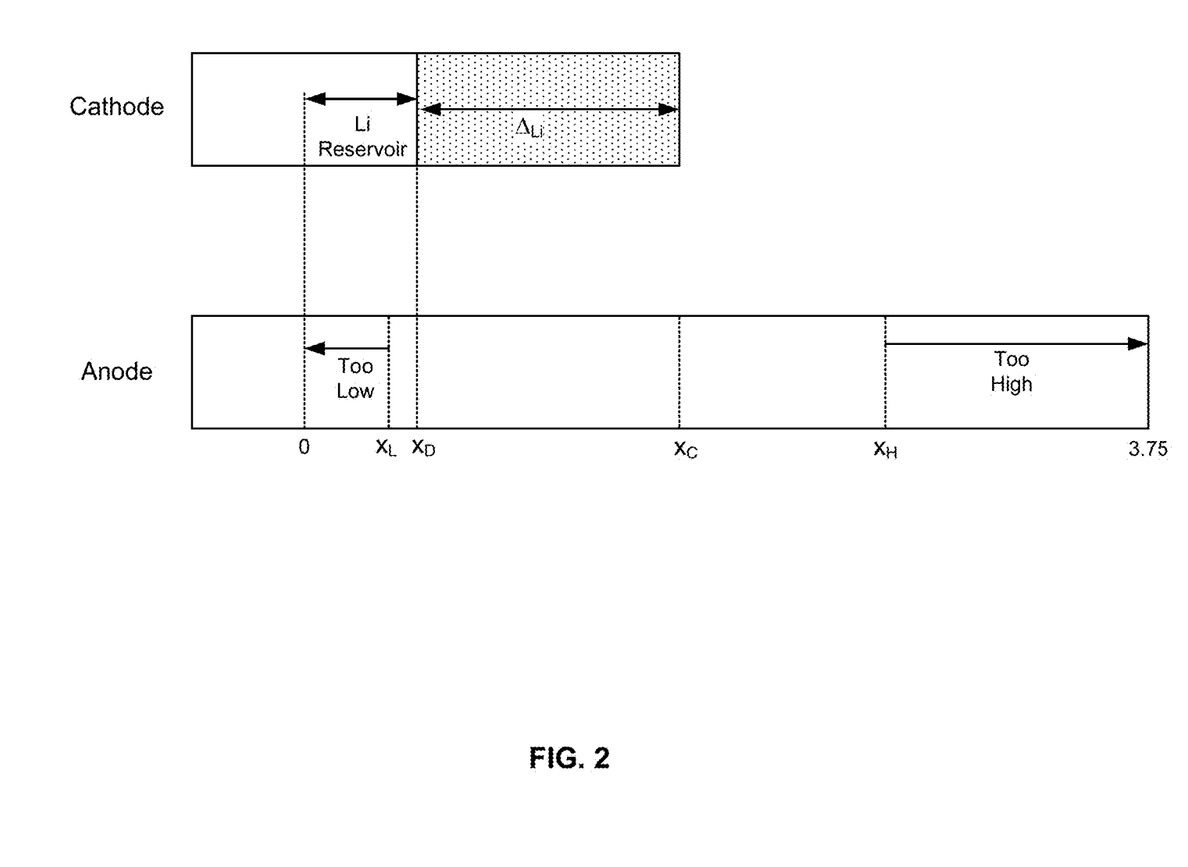
FIG. 2 illustrates an example lithiation and delithiation process for a silicon-dominant anode, in accordance with an example embodiment of the disclosure.

FIG. 2 illustrates an example lithiation and delithiation process for a silicon-dominant anode, in accordance with an example embodiment of the disclosure. Referring to FIG. 2, there are shown lithiation levels for a cathode and a silicon-dominant anode. The cathode lithiation level shows an amount $\Delta_{Li}$ that may be transferred to the anode in a charging process, raising the lithiation level of the anode from $x_D$ to $x_C$. The anode lithiation level is shown on a scale from 0 to 3.75, where 3.75 indicates the fully lithiated phase of silicon, $Li_{3.75}Si$. The amount $\Delta_{Li}$ may be a function of the number of charge carriers in the cathode as well as the cathode discharge cutoff voltage. Therefore, in this example, the lithiation of the anode is controlled by the cutoff voltage, and for best cycle life, it should be kept above $x_L$. The discharged lithiation level, $x_D$, is a function of the irreversible charges of the anode and cathode, $Q_{irr,anode}$ and $Q_{irr,cathode}$, and the cutoff voltage, while the charged lithiation level $x_C$ is a function of the number of charge carriers in the material.

Figure 3:
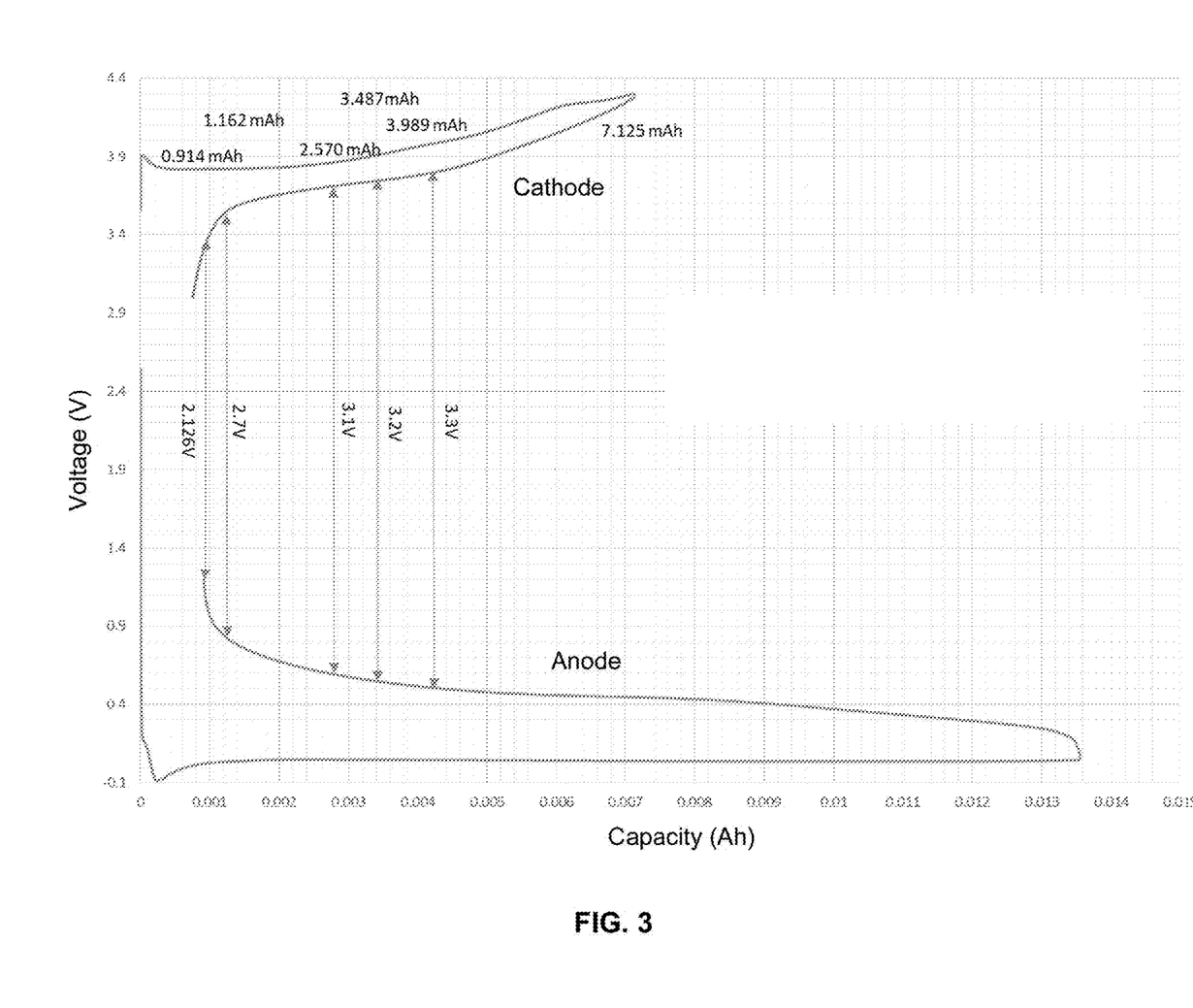
FIG. 3 illustrates voltage profile curves for a lithium ion battery with silicon-dominant anode, in accordance with an example embodiment of the disclosure.

FIG. 3 illustrates voltage profile curves for a lithium ion battery with silicon-dominant anode, in accordance with an example embodiment of the disclosure. Referring to FIG. 3, there is shown voltage profile curves for the anode and cathode and vertical lines with arrows indicating full cell voltage, and the resulting cell capacity in amp-hours on the x-axis for these various full cell voltages.

In this example, the total charge capacity of the cathode is half of the total capacity of the anode. During discharge, the cell voltage can be controlled in a way that the amount of lithium left in the anode is higher than the critical amount $x_L$, as described with respect to FIG. 2. For this particular cell, the cell capacity at 2.7 V is 5.963 mAh, at 3.1V is 4.555 mAh corresponding to 76.4% of total capacity, at 3.2V is 3.638 mAh corresponding to 61.0% of total capacity, and at 3.3 V is 3.136 mAh corresponding to 52.6% of total capacity.

Figure 4:
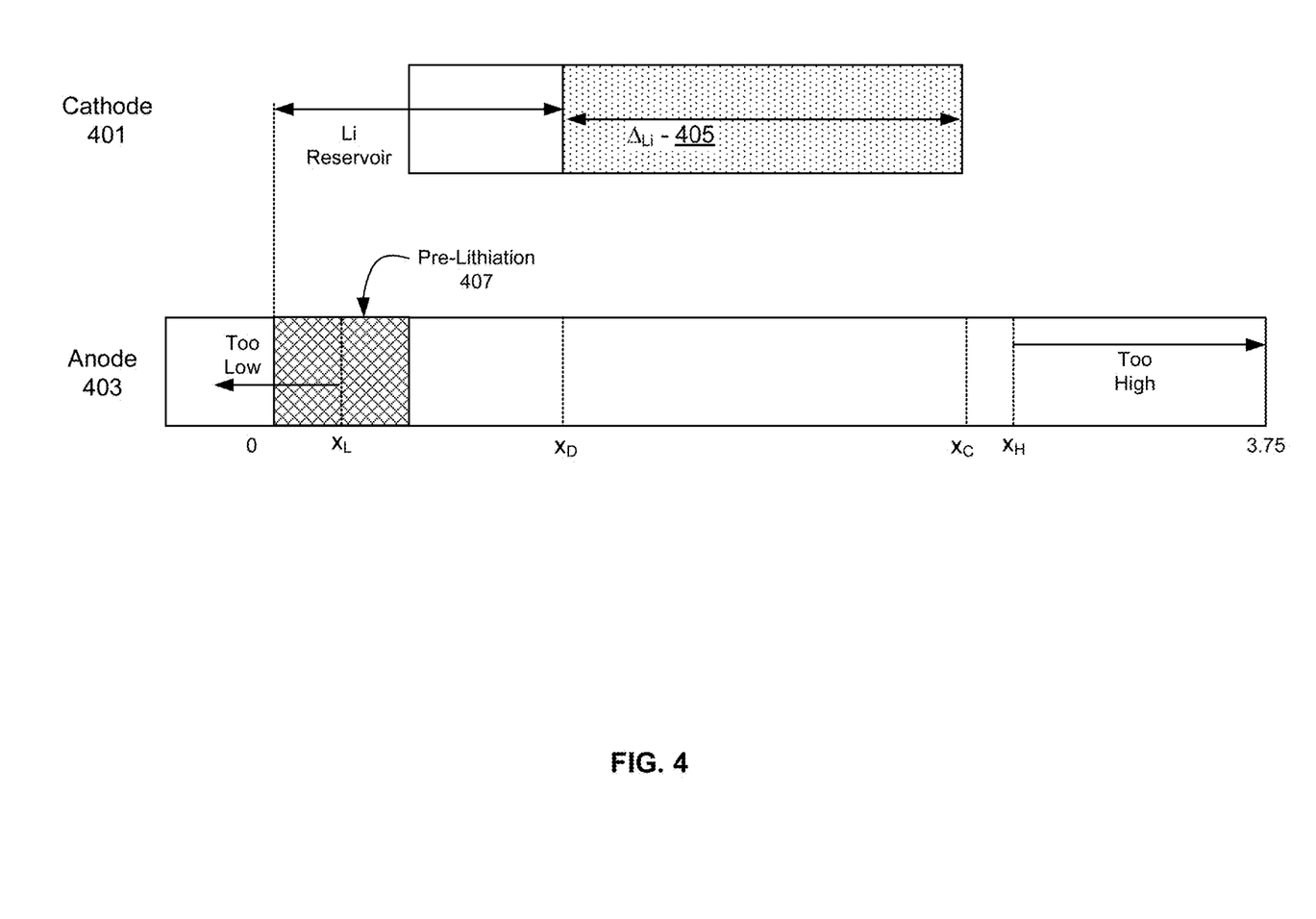
FIG. 4 illustrates an example lithiation and delithiation process for a pre-lithiated silicon-dominant anode, in accordance with an example embodiment of the disclosure.

FIG. 4 illustrates an example lithiation and delithiation process for a pre-lithiated silicon-dominant anode, in accordance with an example embodiment of the disclosure. Referring to FIG. 4, there is shown lithiation level ranges for a cathode 401 and a silicon-dominant anode 403. This example illustrates another way to control the amount of lithium left in the anode ($x_D$) after discharge without having to limit the cell voltage in discharge, which is to either pre-lithiate the anode or use a cathode with an irreversible capacity high enough, so that $x_D$ remains higher than $x_L$ regardless of the cell discharge voltage. As before, the anode lithiation level is shown on a scale from 0 to 3.75, where 3.75 indicates the fully lithiated phase of silicon, $Li_{3.75}Si$.

The cathode lithiation level of FIG. 4 shows an amount $\Delta_{Li}$ 405 that may be transferred to the anode 403 in a charging process as described in FIG. 2, but in this example the silicon anode is pre-lithiated as shown by the pre-lithiation 407, such that the pre-lithiation ensures the lithiation level to be above $x_L$ no matter what cutoff voltage is utilized. In this example, the pre-lithiation allows the full utilization of the cathode capacity while still staying within the limits of $x_L$ and $x_H$.

Figure 5:
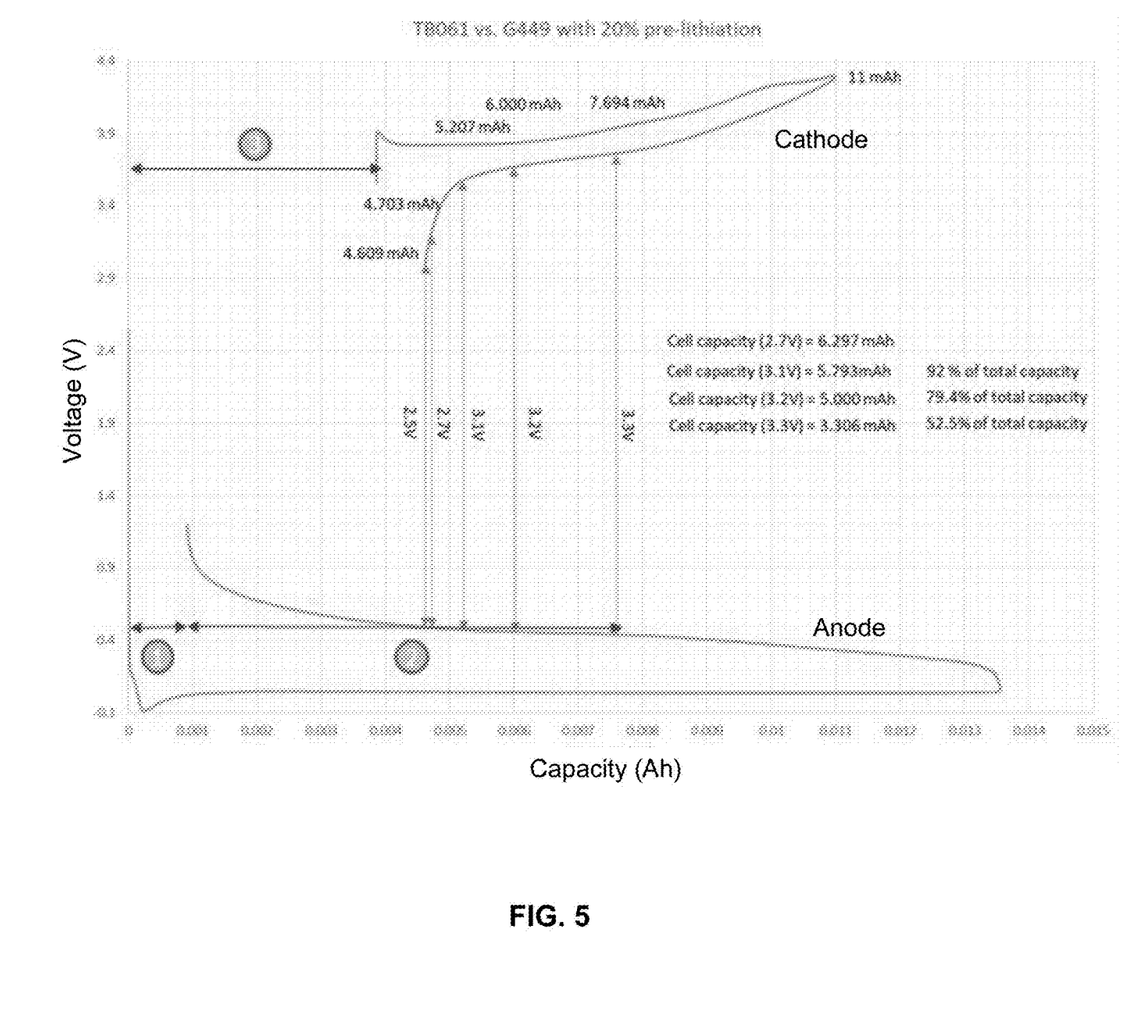
FIG. 5 illustrates voltage profile curves for a lithium ion battery with a pre-lithiated silicon-dominant anode, in accordance with an example embodiment of the disclosure.

FIG. 5 illustrates voltage profile curves for a lithium ion battery with a pre-lithiated silicon-dominant anode, in accordance with an example embodiment of the disclosure. Referring to FIG. 5, there is shown voltage profile curves for the anode and cathode and vertical lines with arrows indicating full cell voltage, and the resulting cell capacity in amp-hours on the x-axis for the various full cell voltages. There is also shown (1) "lost" lithium, (2) "active" lithium, or lithium reservoir, and (3) the pre-lithiation.

As compared to the anode without pre-lithiation of FIG. 3, due to the pre-lithiation (3) of the anode, the voltage curve of the anode extends to higher capacity with a peak of 11 mAh. For this particular cell with 20% pre-lithiation, the cell capacity at 2.7 V is 6.297 mAh, at 3.1V is 5.793 mAh corresponding to 92% of total capacity, at 3.2V is 5.000 mAh corresponding to 79.4% of total capacity, and at 3.3 V was 3.306 mAh corresponding to 52.5% of total capacity, demonstrating significant improvement over cells that are not pre-lithiated.

Figure 7:
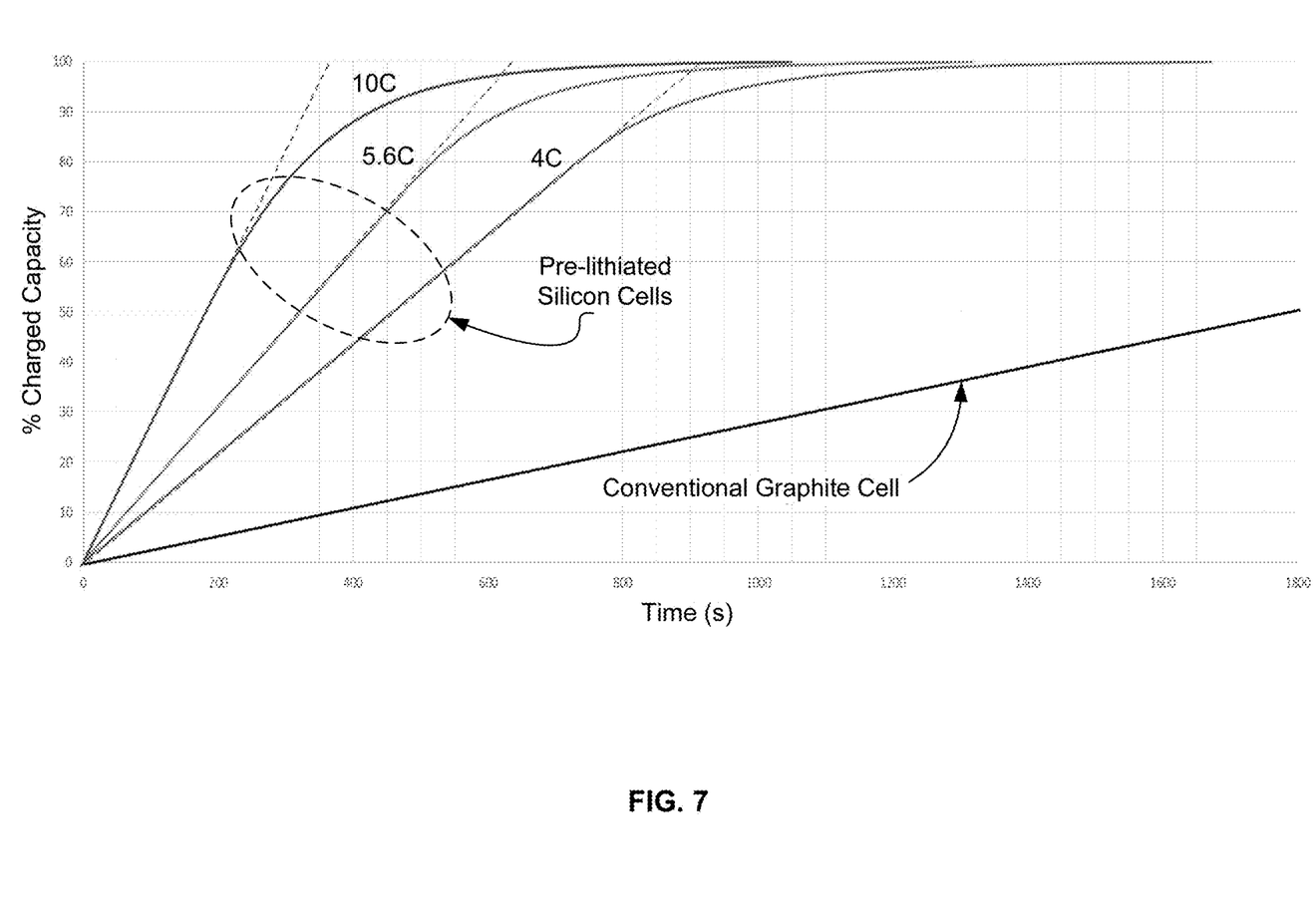
FIG. 7 illustrates the fast charging capability of a cell with a silicon-dominant anode, in accordance with an example embodiment of the disclosure.
Figure 8:
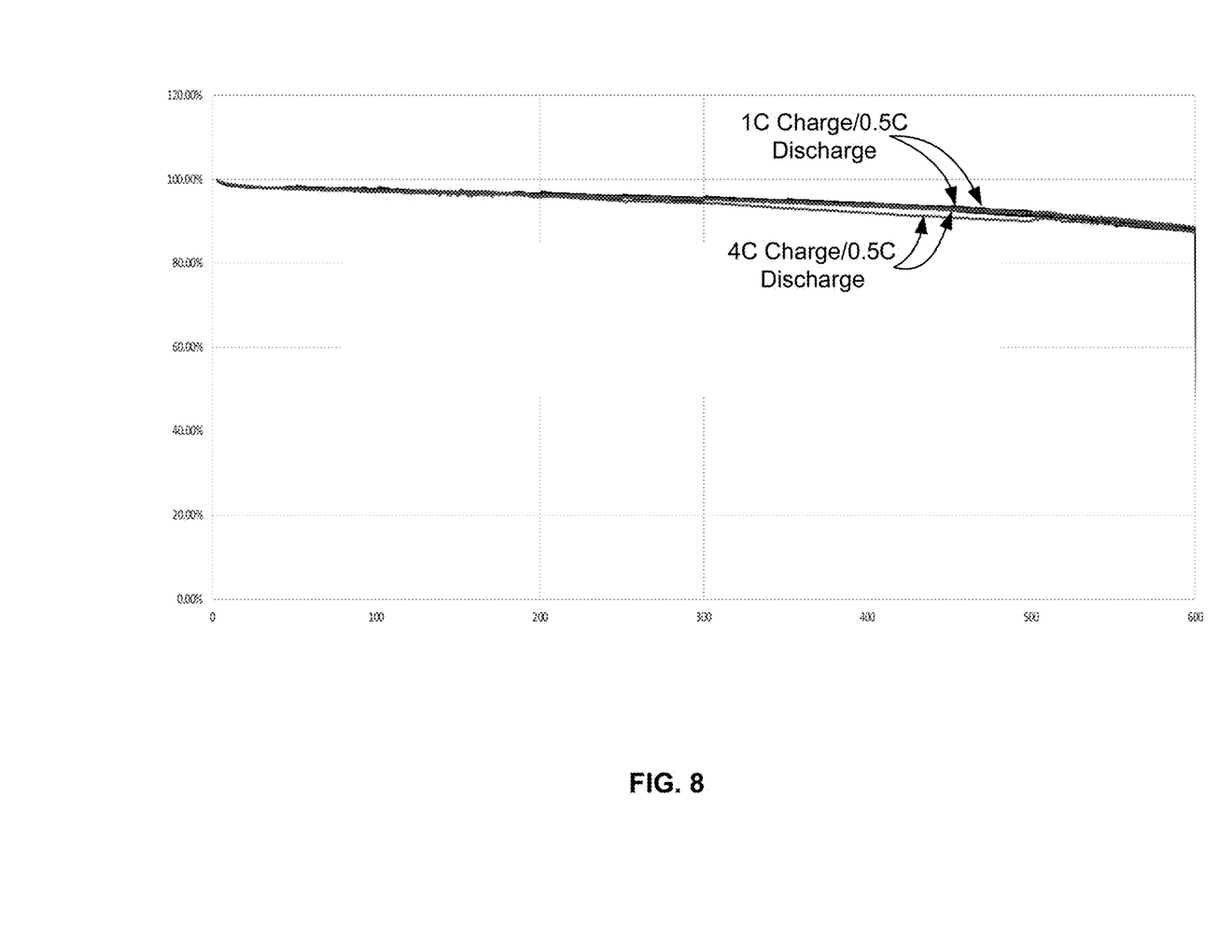
FIG. 8 is a plot illustrating cell cycle life versus charge rate for a silicon-dominant anode cell, in accordance with an example embodiment of the disclosure.

Furthermore, in addition to improved cell capacity, pre-lithiation also enables 1) controlled expansion and contraction of silicon during charge and discharge cycles of the Li-ion cell, which minimizes silicon particle cracking, pulverization, and SEI growth; 2) reduced cell capacity fading during cycle life due to controlled silicon expansion/contraction and silicon anode voltage window; 3) maximized cathode capacity utilization in a lithium-ion cell using silicon as an anode material while still maintaining good cycle life and limited cell expansion; and 4) fast charging, because silicon is used in a range where it cannot be over-lithiated and the stress on the particles is minimized, which enables high rate charging and cycling of the cell as described with respect to FIGS. 7 and 8.

Figure 6:
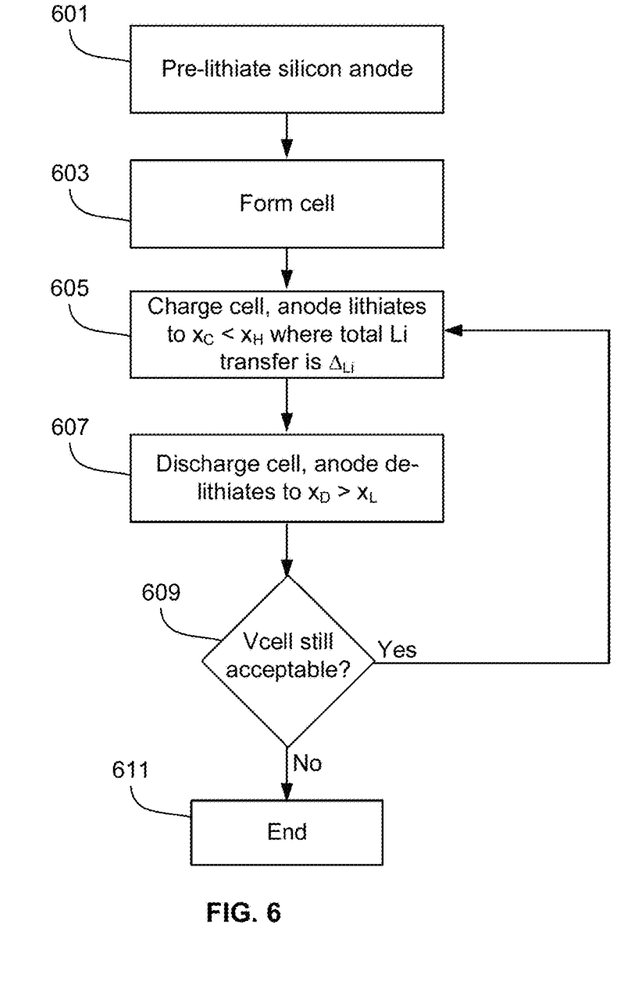
FIG. 6. illustrates a pre-lithiated silicon anode process, in accordance with an example embodiment of the disclosure.

FIG. 6. illustrates a pre-lithiated silicon anode process, in accordance with an example embodiment of the disclosure. Referring to FIG. 6, the process begins with step 601 where a silicon-dominant anode may be pre-lithiated to a level between 3% and 95% lithiation, for example. The battery, or cell, may be formed with the pre-lithiated silicon anode, a cathode, and electrolyte in step 603.

In step 605, the battery may be charged such that the anode is lithiated by lithium from the cathode until the lithiation level reaches $x_C$, which is kept less than $x_H$, to avoid negatively impacting the cycle life of the battery. The total amount of lithium transferred may be $\Delta_{Li}$, as discussed above with respect to FIG. 4. In a first example, $x_C$ ranges from 1.125 to 3.5625, which corresponds to 30% to 95% silicon lithiation, where 3.75 is the maximum lithiation of silicon. In a second example, $x_C$ ranges from 1.125 to 3.1875, which corresponds to 30% to 85% silicon lithiation. In a third example, $x_C$ ranges from 1.125 to 2.8125, which corresponds to 30% to 75% silicon lithiation. In a fourth example, $x_C$ ranges from 1.125 to 2.4375, which corresponds to 30% to 65% silicon lithiation. In a fifth example, $x_C$ ranges from 1.125 to 1.875, which corresponds to 30% to 50% silicon lithiation.

In step 607, the battery may be discharged such that the anode is delithiated to a level $x_D$, which is kept greater than $x_L$ due to the pre-lithiation, and the lithium returns to the cathode. In a first example, $x_D$ ranges from 0.12 to 1.875, which corresponds to 3% to 50% residual lithium in silicon. In a second example, $x_D$ ranges from 0.12 to 1.5, which corresponds to 3% to 40% residual lithium in silicon. In a third example, $x_D$ ranges from 0.12 to 1.125, which corresponds to 3% to 30% residual lithium in silicon. In a fourth example, $x_D$ ranges from 0.12 to 0.75, which corresponds to 3% to 20% residual lithium in silicon. In a first example, $x_D$ ranges from 0.12 to 0.375, which corresponds to 3% to 10% residual lithium in silicon.

In step 609, if the cell voltage is still acceptable, i.e., the cell is not at the end of its life cycle, the process may return to step 605 to be charged and discharged again.

FIG. 7 illustrates the fast charging capability of a cell with a silicon-dominant anode, in accordance with an example embodiment of the disclosure. Referring to FIG. 7, there is shown a charging curve for a cell with a conventional graphite anode and charging curves for a cell with pre-lithiated silicon-dominant anode at 4C, 5.6C, and 10C charge rates. As indicated by the plots, the silicon-dominant anode cell can be charged at very high rates. Accordingly, the lithiation level of the silicon is controlled through cell design and/or best use of the silicon anode. A lithium reservoir is needed for best performance of the cell, and the reservoir may be created by utilizing the cathode in the manner described with respect to FIGS. 2 and 3, or through prelithiation, as discussed with respect to FIGS. 4 and 5.

FIG. 8 is a plot illustrating cell cycle life versus charge rate for a silicon-dominant anode cell, in accordance with an example embodiment of the disclosure. As shown by the nearly co-linear plots, there is essentially no difference in cell life for a cell charged at a 4C rate as compared to a cell charged at 0.5C. Both cells retain 92% of their capacity out to 500 cycles.

In an example embodiment of the disclosure, a method and system is described for silicon dominant lithium-ion cells with controlled lithiation of silicon. The battery may comprise a cathode, an electrolyte, and an anode. The anode may comprise silicon lithiated at a level after discharge that is configured to be above a minimum threshold level, where the minimum threshold lithiation is 3% silicon lithiation. The silicon lithiation level after discharge may be configured by a discharge voltage of the anode. The silicon lithiation level after discharge may be configured by a prelithiation level of the silicon. The silicon lithiation level after discharge may be configured by an irreversible discharge capacity of the cathode. The lithiation level of the silicon after charging the battery may range between 30% and 95% silicon lithiation, between 30% and 75% silicon lithiation, between 30% and 65% silicon lithiation, or between 30% and 50% silicon lithiation. The lithiation level of the silicon after discharging the battery may range between 3% and 50% silicon lithiation, between 3% and 30% silicon lithiation, or between 3% and 10% silicon lithiation. The minimum threshold level may be a lithiation level below which a cycle life of the battery degrades. The electrolyte may comprise a liquid, solid, or gel.

In another example embodiment, a method and system is described for an anode for use in a battery, the anode comprising silicon that is lithiated above a minimum threshold level upon discharge when incorporated in a lithium ion battery, where the silicon lithiation level after discharge is configured by a discharge voltage of the anode or by a prelithiation level of the silicon.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A battery, the battery comprising:
a cathode, an electrolyte, and an anode, the anode comprising silicon lithiated at a level after discharge that is configured to be above a minimum threshold level that is equal to or lower than a prelithiation level of the silicon, wherein the minimum threshold lithiation is 3% silicon lithiation.

2. The battery according to claim 1, wherein the lithiation level of the silicon after discharge is configured by a discharge voltage of the anode.

3. The battery according to claim 1, wherein the lithiation level of the silicon after charging the battery ranges between 30% and 95% silicon lithiation.

4. The battery according to claim 1, wherein the lithiation level of the silicon after charging the battery ranges between 30% and 75% silicon lithiation.

5. The battery according to claim 1, wherein the lithiation level of the silicon after charging the battery ranges between 30% and 65% silicon lithiation.

6. The battery according to claim 1, wherein the lithiation level of the silicon after charging the battery ranges between 30% and 50% silicon lithiation.

7. The battery according to claim 1, wherein the lithiation level of the silicon after discharging the battery ranges between 3% and 50% silicon lithiation.

8. The battery according to claim 1, wherein the lithiation level of the silicon after discharging the battery ranges between 3% and 30% silicon lithiation.

9. The battery according to claim 1, wherein the lithiation level of the silicon after discharging the battery ranges between 3% and 10% silicon lithiation.

10. The battery according to claim 1, wherein the minimum threshold level is a lithiation level below which a cycle life of the battery degrades.

11. The battery according to claim 1, wherein the electrolyte comprises a liquid, solid, or gel.

12. An anode for use in a cell of a battery, the anode comprising silicon that is lithiated above a minimum threshold level upon discharge of the cell when incorporated in a lithium ion battery, wherein a silicon lithiation level after discharge of the cell is set by a voltage of the anode at a discharge mode of the cell or a prelithiation level of the silicon.

* * * * *